United States Patent Office

3,116,266
Patented Dec. 31, 1963

3,116,266
SCORCH RESISTANT, THERMALLY CURABLE
POLYMERIC COMPOSITIONS AND THEIR
CURING
David Alwyn Stivers and Don L. Peterson, St. Paul,
Minn., assignors to Minnesota Mining and Manufacturing Company, St. Paul, Minn., a corporation of
Delaware
No Drawing. Filed June 17, 1960, Ser. No. 36,745
6 Claims. (Cl. 260—45.7)

This invention relates to a method for crosslinking fluorinated polymers and crosslinking compositions for use therein. In one aspect this invention relates to a new scorch resistant vulcanization admixture. In another aspect this invention relates to the crosslinking of linear fluorinated polymers. Still another aspect of this invention relates to the modification of the characteristics of chain saturated polymers containing halogen substituents on the carbon atoms, particularly those polymers having elastomeric properties.

Chain polymers are generally thermoplastic in nature and exhibit continuous flow under the influence of heat and pressure. Such polymers can be resoftened as often as desired and are usually soluble in selected solvents. However, crosslinked or vulcanized polymers are generally thermosetting, i.e. insoluble in most solvents and incapable of being resoftened without decomposiiton since they are permanently hardened. A chain or linear polymer may, nevertheless, contain a small number of crosslinkages without losing its thermoplastic properties. It is often desirable to convert thermoplastic polymers into crosslinked polymers or to partially crosslink polymers in order to decrease their solubility and thermoplastic flow properties and, in the case of thermoplastic elastomers, to obtain a harder and tougher product. The crosslinking of elastomers is commonly referred to as vulcanization.

Among the most difficultly vulcanizable thermoplastic resins are those prepared by the polymerization of halogenated monoolefins, such as, for example, the copolymers of chlorotrifluoroethylene and vinylidene fluoride and the copolymers of perfluoropropene and vinylidene fluoride. Many of these fluorinated thermoplastic polymers have unique and valuable properties. In some cases, when it is desired to retain these properties and at the same time decrease the thermoplastic flow and solubility, the polymers are crosslinked. Such crosslinking has heretofore been difficult to accomplish satisfactorily with certain highly desirable crosslinking agents due to an excessively rapid curing rate and the resultant "scorching" (i.e. precuring) in the mill, extruder, etc. and "backrinding" (i.e. pitting and nonuniformity at the flash line when molding or curing).

The polyfunctional organic compounds containing at least two primary or secondary amino groups per molecule represent highly desirable crosslinking agents for these fluorinated polymers. However, by virtue of their high order of reactivity as crosslinking or vulcanization agents, practical vulcanization procedures are extremely difficult. For example, one disadvantage in the vulcanization of these fluorinated polymers is observed when blending the vulcanizing agent, e.g. a polyamine, into the polymeric material by mechanical shearing forces. The blending takes place over an extended period of time, and the shearing forces generate heat. The high temperature thus generated causes the initiation of the crosslinking reaction either prior to the complete blending of the vulcanizing agent into the polymeric material or in subsequent processing procedures, such as extrusion, calendering, etc. The crosslinking reaction is thereby self initiated, since it is exothermic and causes an increase in temperature. This results in scorching during the milling process owing to the nonuniformly blended vulcanizing agent.

It is possible to control the reactivity of the crosslinking reaction somewhat by using acyclic polyfunctional amine salts which contain a terminal carbamic radical and correspond to the formula $N_2C_nH_2X_{2n}O_2$ wherein X is selected from the group consisting of hydrogen, chlorine and fluorine atoms and alkyl, aryl and amino radicals, $n$ is an integer from 3 to 20, and at least one hydrogen atom is bonded to each of the nitrogen atoms. Such crosslinking agents are described in U.S. patent application Serial No. 839,292, filed September 11, 1959. However, even though these crosslinking agents permit a more controlled, slower cure rate than the polyamines, still further control and a somewhat slower cure is often desired to eliminate the disadvantages mentioned above.

It is therefore an object of this invention to provide a new and improved crosslinking composition.

Another object of this invention is to provide a new curable, fluorinated polymer composition.

Still another object of this invention is to provide a new method for crosslinking vulcanizable fluorinated elastomers.

A further object of this invention is to provide a method for regulating the cure rate of vulcanizable fluorinated elastomers and for preventing scorching and backrinding.

Other objects and advantages of the present invention will become apparent to those skilled in the art from the accompanying description and disclosure.

According to this invention, a curable, highly fluorinated polymeric material is uniformly admixed with a carbon dioxide provider and a crosslinking agent selected from the group consisting of polyamines and carbamic radical-containing salts of acyclic polyfunctional amines. This admixture, with or without additional compounding agents and additives, is then permitted to crosslink, it being understood that the carbon dioxide provider does not enter into the crosslinking reaction.

The vulcanizable polymers which are cured according to this invention are linear, chain saturated, fluorinated polymers which contain reactive substituents selected from the group consisting of fluorine, chlorine, bromine and iodine atoms, ether and ester radicals, and which are at least half halogenated. The preferred vulcanizable polymers are at least half fluorinated; however, when the polymer is perhalogenated it is preferable that the entire polymer chain does not contain —$CF_2$— units. Homopolymers of tetrafluoroethylene and other perfluorinated olefins, and copolymers with other perfluorinated comonomers require very high temperature to effect crosslinking. It becomes difficult at such temperatures to control the distribution of the crosslinking agent in the polymer, and a non-uniformly crosslinked polymer may be produced.

Linear fluorinated elastomers generally contain disordered, saturated, fluorinated carbon chains which include a substantial number of —$CH_2$— units, usually at least 10 percent of the chain carbon atoms. Disorder in the carbon chains is ordinarily achieved by the copolymerization of at least two monoolefinic compounds of the type hereinafter described. When one of the monoolefinic compounds contains an unsaturated chain of three or more carbon atoms, alkyl side groups, i.e. methyl, ethyl, etc., are present in the final polymer, and these alkyl groups are preferably perhalogenated, most preferably perfluorinated. Points of unbalance in the carbon chain, which are necessary for elastomeric properties, are provided by these side groups. Such side groups cause a bending of the linear carbon chain and then provide additional degrees of freedom in space, produce an unsymmetrical or unbalanced chain carbon atom to which they are attached (provided a second similar group is not also attached to the same chain carbon atom). However, unbalance is also provided by the presence of other unbalanced units in the linear carbon chain, such as —CFCl—. Irrespective of the units providing such points of imbalance, whether by two physically different substituent atoms or by a side group on a chain carbon atom, at least 10 percent of the chain carbon atoms should be unbalanced.

The linear, saturated, fluorinated carbon chain in the elastomers may also contain chlorine substituents, provided a single chain carbon atom has no more than one chlorine attached thereto to produce instability or to influence the chemical nature of the elastomer. The presence of more than one perfluoroalkyl side chain or chlorine substituent on a single chain carbon atom produces symmetry and a point of rigidity in the chain, decreasing the flexibility of the chain and the elastomeric properties accordingly.

Among the chain saturated polymers which may be crosslinked in accordance with this invention are the polymers of chlorotrifluoroethylene, vinylidene fluoride, 2-chloroperfluoropropene, chlorotrifluoroethylene, dichlorodifluoroethylene, trifluoroethylene, chlorofluoroethylene, vinylidene fluoride and vinylidene chloride. These monoolefins may be copolymerized with each other in groups of two or more and in any proportions. They may also be copolymerized with other olefinic compounds such as ethylene, tetrafluoroethylene and perfluoropropene.

Particularly preferred are the fluorinated elastomers produced by copolymerizing chlorotrifluoroethylene and vinylidene fluoride, as described in U.S. Patent 2,752,331, and those produced by copolymerizing perfluoropropene and vinylidene fluoride, as described in British complete specification 823,974, published November 18, 1959. It is also within the scope of this invention to cure the lower molecular weight, liquid polymers and copolymers of the above monomers.

One class of crosslinking agents used in accordance with this invention include primary and secondary polyamines, such as are described in U.S. Patent 2,793,200. Other acyclic polyamines include tetraethylenepentamine, hexamethylenediamine, trimethylenediamine, pentamethylenediamine, triethylenetetramine, diethylenetriamine, pentamethylenediamine, decamethylenediamine, undecamethylenediamine, N-trichloromethylpentamethylenediamine, N - phenylhexamethylenediamine, beta - phenylbutylenediamine, heptamethylenediamine, and homologs and isomers thereof.

A second class of crosslinking agents used in accordance with this invention include acyclic or cycloaliphatic polyfunctional amine salts which contain a terminal carbamic radical, herein also called "carbamate." The preferred crosslinking agents of this class have the formula YHN—R—X wherein R is a cyclic or acyclic alkylene radical containing from 2 to 15 carbon atoms; Y is a hydrogen atom, an alkyl radical or an aryl radical; and X is a carbamic radical wherein one of the oxygen atoms is bonded to a hydrogen atom, as in —NHCOOH. These compounds are more commonly referred to as Zwitter ions, i.e. having positive and negative charges, and are usually set forth as $^+YH_2N$—R—$NHCOO^-$. The alkylene radical in the above formulae can be a hydrocarbon or a substituted hydrocarbon radical and is preferably an unsubstituted hydrocarbon radical. When the alkylene radical is substituted it contains at least one substituent other than hydrogen which is selected from the group consisting of amino, alkyl and aryl radicals and fluorine and chlorine atoms and any combination of the foregoing substituents. When Y is an alkyl or aryl radical, the radicals may be substituted with chlorine and/or fluorine atoms; however, when Y is an alkyl or aryl radical, the radicals are preferably unsubstituted hydrocarbon radicals. Y is most preferably hydrogen. Those crosslinking agents having an acyclic unsubstituted alkylene radical containing from 6 to 10 carbon atoms and having a terminal ammonia group ($^+H_3N$—) and a terminal carbamic radical (—$NHCH^-$), as in hexamethyleneamino carbamic acid inner salt, $$^+H_3N-(CH_2)_6NHCOO^-$$

and the decamethyleneamino carbamic acid inner salt $^+H_3N-(CH_2)_{10}NHCOO^-$, are most preferred. Other alkylene carbamic acid salts include tetraethylenetetraaminocarbamic acid salt, pentamethyleneaminocarbamic acid salt, heptamethyleneaminocarbamic acid salt, N-phenylhexamethyleneaminocarbamic acid salt, decamethyleneaminocarbamic acid salt, N-carboxypentamethylenediamine, etc. The preferred alkyleneaminocarbamic acid salts of this invention which contain from 3 to 16 carbon atoms are mostly powdery materials and therefore are readily compounded with the polymer.

The above carbamic acid inner salts are prepared by reacting the corresponding polyamines with carbon dioxide under anhydrous conditions. The polyamine is dissolved in a non-polar solvent, such as para-xylene, benzene and toluene, before reacting it with excess carbon dioxide at temperatures between about 20° C. and 100° C., depending upon the solvent used. A method for the preparation of such carbamic acid inner salts is described in patent application Serial No. 839,292, filed September 11, 1959.

Generally, the amount of crosslinking agent employed in this invention can be varied between about 0.1 and about 10 parts of crosslinking agent per 100 parts by weight of curable polymer. However, a smaller amount of crosslinking agent may be used when it is desirable to provide a lesser degree of crosslinging. It is also permissible to employ a larger amount of crosslinking agent if the product desired is a highly vulcanized polymer where crosslinking takes place at almost all of the possible sites. The above described crosslinking agents are relatively reactive compounds, particularly the polyamines, and the use of a carbon dioxide provided in conjunction therewith to retard the curing reaction appears to be peculiar to these particular crosslinking agents.

The carbon dioxide liberating compounds to be used in the compositions and process of this invention can be selected from any compound that relases carbon dioxide at the particular processing temperature employed, usually below about 350° F. and most preferably between about 100° F. and 300° F. Thus, for example, when milling an elastomeric copolymer of perfluoropropene and vinylidene fluoride, temperatures of between about 125° F. and 250° F. are usually attained in the milling operation, and the addition to the polymeric composition of a compound which decomposes and liberates carbon dioxide at the milling temperature serves to retard the cure rate and prevent undesirable scorching during the milling or blending operation. In molding elastomeric polymers of perfluoropropene and vinylidene fluoride, temperatures of between about 275° F. and 350° F. are commonly employed, and a compound that liberates carbon dioxide at this temperature or lower is selected. Although the use of a single carbon dioxide liberating agent which releases $CO_2$ at the milling temperature usually also serves effectively to retard the curing rate during molding other high temperature processing, it may be desirable in certain cases to employ a combination of two or more of such agents, each of which is selected primarily to release carbon dioxide during the particular temperature attained in one processing step.

As mentioned earlier, selection of the particular carbon dioxide provider depends primarily on the processing temperature and, of course, on the amount of cure rate retardation desired or necessary to eliminate the otherwise considerable processing problems and undesirable effects, e.g. scorching, backrinding, etc. The amount of the carbon dioxide liberation used similarly depends on the particular compound selected and the amount of cure rate retardation desired. Generally, the amount of carbon dioxide liberator ranges from about 0.1 to about 10 parts per 100 parts by weight of curable polymer, usually between 0.5 and about 5 parts per 100 parts by weight of curable polymer.

Among the more readily available and useful carbon dioxide providers are magnesium carbonate, benzoyl peroxide, para-formaldehyde, formic acid, oxalic acid, malonic acid, ammonium carbonate, etc. Carbon dioxide itself is within the scope of carbon dioxide providers and can be employed in one embodiment by processing the curable composition in a $CO_2$ environment. Although the carbamic radical containing crosslinking agents may produce polyamines upon decomposition, it is to be understood that the carbon dioxide providers of this invention are not cross-linking agents but rather serve as an adjunct to the cross-linking agents described earlier.

When a fluorinated polymer is crosslinked a hydrogen atom of the amino group combines with a halogen atom bonded to a carbon atom of the polymer chain, hydrogen halide is condensed out, and the nitrogen of the amino group is bonded to the carbon atom from which the halogen has been removed. Since hydrogen halide is evolved in the reaction, the curing proceeds most favorably when hydrogen halide is removed. Although removal of hydrogen halide is not essential for the preparation of suitably crosslinked polymer, it is desirable to neutralize and eliminate the hydrogen halide by the addition of a basic compound, preferably an inorganic acid acceptor such as a metal oxide of lead, zinc or magnesium or Dyphos (lead oxide-lead phosphite) or any combination thereof. In some cases, particularly when crosslinking thin polymer sections, the hydrogen halide may be volatilized off at the temperatures used in the crosslinking reaction. When an inorganic acid acceptor is employed, it is usually added to the vulcanization mixture in an amount between about 1 and about 25 parts per 100 parts by weight of curable polymer.

Fillers are often added to the polymers discussed above to improve the molding characteristics and other properties. When a filler is employed it is added to the vulcanization recipe in an amount between about 0.5 and about 50 parts by weight, preferably between about 1 and about 10 parts, per 100 parts by weight of curable polymer. Examples of fillers which may be used to improve molding characteristics of the polymers involved in the crosslinking or curing process of this invention are Syton-200 silica, a precipitated silica such as Hysil-303, a silicon tetrachloride which has been treated in an oxidizing flame, such as Cabotsil, and a clay silicate such as magnesium aluminum silicate (Iceberg Pigment). Plasticizer and softeners, preferably ester type materials, are also added if desired.

Another additive which does not significantly affect the cure but which may increase modulus, tensile strength and hardness of the polymer is a high abrasion furnace carbon or carbon black such as, for example, Statex-R carbon black, Phil-black O, channel black, and thermal black. Although from about 5 to about 200 parts by weight of carbon black may be employed per 100 parts of curable polymer, it is generally preferred to use from about 1 to about 50 parts of black, most preferably from 15 to 25 parts.

In accordance with this invention, the desired amount of the cross-linking agent and the carbon dioxide provider is added to the unvulcanized fluorocarbon polymer and is intimately admixed therewith or compounded by employing any of the usual rubber mixing devices, such as Banbury mixers, roll mills, or any other convenient mixing device. It has been found that a two-roll rubber mill equipped with heat exchange means, e.g. cored chambers for cooling, is particularly suitable since the heat generated by the high shearing forces in mixing can be dissipated and the temperature more accurately regulated with this device or with devices providing other means for temperature control.

For best results the temperatures of the mixture on the mill is not allowed to rise above about 250° F. and is not allowed to fall below 30° F. During milling it is necessary to distribute the crosslinking agent uniformly throughout the curable polymer. However, it is desirable to prevent extensive crosslinking in the compounding step since most of these fluorinated polymers cannot be cast in a mold after a substantial amount of crosslinking has taken place. Although the mechanism is not clear, the use of a non-crosslinking agent which provides carbon dioxide in situ during the processing of the curable fluorinated polymer and the polyamine or carbamate effectively retards the otherwise rapid curing or crosslinking reaction depending on the $CO_2$ concentration thereby provided in the admixture, thus permitting flexibility in cure rate without varying the amount of crosslinking agent used and without unusual processing and handling techniques.

After the composition is milled, the compounded mixture so prepared can be cured immediately or can be stored for a period of two days or more and then cured. The curing process comprises pressing the compounded mixture in a mold and then usually baking the pressing in an oven. Pressing of the compounded mixture is conducted at a temperature between about 200° F. and about 450° F., preferably between about 275° F. and about 350° F. for a period of from 10 minutes to about 15 hours, usually from 30 minutes to 2 hours. A pressure of between about 100 and about 2,000, preferably between about 500 and about 1,000 p.s.i.g. is imposed on the compounded mixture in the mold. The molds may be first coated with release agents, such as a silicone oil (e.g. DC–200), and prebaked. The molded vulcanizate is then usually baked at a temperature between about 300° F. and about 500° F., preferably at about 400° F. for a period of from 2 hours or less to 25 hours depending on the cross-sectional thickness of the sample. The molds are generally baked at atmospheric pressure, although pressures up to 15 or 20 atmospheres may be applied if desired.

The examples in Table I are offered as a better understanding of the present invention and are not to be unnecessarily construed as limiting the scope thereof. The Mooney scorch readings are indicative of resistance to premature curing of the compounded stock. These readings are derived from the test described in ASTM D 1077–55T, using the small rotor at 250° F., and represent the time required for the Mooney viscosity to rise 10 units from the lowest viscosity value.

Table 1

| Run No | 1 | 2 | 3 | 4 | 5 | 6 | 7 | 8 |
|---|---|---|---|---|---|---|---|---|
| Mooney Reading | 27 | 25 | 13 | 12 | 11 | 26 | 17 | [1] 27 |
| "Fluorel" [2] | 100 | 100 | 100 | 100 | 100 | 100 | 100 | 100 |
| MgO | 20 | 20 | 20 | 20 | 20 | 20 | 20 | 20 |
| Carbon black | 15 | 15 | 15 | 15 | 15 | 15 | 15 | 15 |
| Hexamethylene-diamine carbamate | 1 | 1 | 1 | 1 | 1 | 1 | 1 | 1 |
| Paraformaldehyde | 5 | 1 | | | .25 | .5 | .75 | .75 |
| Ammonium oxalate | | | 1 | | | | | |
| Benzoyl peroxide | | | | .5 | | | .5 | .5 |
| Benzoyl monoamine | | | | 1 | | | | |

| Run No | 9 | 10 | 11 | 12 | 13 | 14 | 15 | 16 |
|---|---|---|---|---|---|---|---|---|
| Mooney Reading | 25 | 11 | 16 | 25 | 25 | 25 | 21 | 25 |
| "Fluorel" [2] | 100 | 100 | 100 | 100 | 100 | 100 | 100 | 100 |
| MgO | 20 | 20 | 20 | 20 | 20 | 20 | 20 | 20 |
| Carbon black | 15 | 15 | 15 | 15 | 15 | 15 | 15 | 15 |
| Hexamethylene-diamine carbamate | 1 | 1 | 1 | 1.4 | 1.1 | 1.1 | .75 | .5 |
| Paraformaldehyde | | | | .5 | | | | |
| Ammonium oxalate | | | 1 | | | | | |
| Benzoyl peroxide | | | | | | 1.5 | 1 | 1 |
| Benzoyl monoamine | .5 | .75 | .25 | | | | .25 | .25 |
| Cu inhibitor [3] | .5 | | | | | | | |
| MgCO₃ | | | | .2 | | .5 | .75 | 1.5 |
| Dibenzoyl quinonedioxime | | | | 5 | | .75 | | |

| Run No | 17 | 18 | 19 | 20 | 21 | 22 | 23 | 24 |
|---|---|---|---|---|---|---|---|---|
| Mooney Reading | 25+ | 15 | 25 | 20 | 25 | 17.5 | 16.5 | 12 |
| "Fluorel" [2] | 100 | 100 | 100 | 100 | 100 | 100 | 100 | 100 |
| MgO | 20 | 20 | 20 | 20 | 20 | 20 | 20 | 20 |
| Carbon black | 15 | 15 | 15 | 15 | 15 | 15 | 15 | 15 |
| Hexamethylene-diamine carbamate | .5 | 1.2 | 1 | 1 | 1 | 1 | 1 | 1 |
| Paraformaldehyde | | | | | | | | |
| Ammonium oxalate | 1.5 | 1 | | | | | | |
| Benzoyl peroxide | .25 | .5 | | | | | | |
| Cu inhibitor [3] | 1 | .4 | | | | | | |
| MgCO₃ | | | | | | | | |
| Dibenzoyl quinone-dioxime | | | | | | | | |
| Oxalic acid | | | 10 | 1 | | | | |
| Malonic acid | | | | | 10 | 1 | | |
| Formic acid | | | | | | | 10 | 1 |

| Run No | 25 | 26 | 27 | 28 | 29 | 30 | 31 |
|---|---|---|---|---|---|---|---|
| Mooney Reading | 9 | 24 | 15 | 1 | 9 | 8 | 13 |
| "Fluorel" [2] | 100 | 100 | 100 | 100 | 100 | 100 | 100 |
| MgO | 20 | 20 | 20 | 20 | 20 | 20 | 20 |
| Carbon black | 15 | 15 | 15 | 15 | 15 | 15 | 15 |
| Hexamethylene-diamine carbamate | | | 1.2 | | 1 | 1.5 | .5 |
| Ammonium oxalate | 1 | 1 | 1 | | | | |
| Benzoyl peroxide | .5 | .5 | .5 | | | | |
| Cu inhibitor [3] | | | .4 | | | | |
| Hexamethylene diamine | 1 | 1 | | 1 | | | |
| Ammonium sulfate | | 1 | 2 | | | | |

[1] Heated slightly on mill before running Mooney Test (15 min./250° F.)
[2] "Fluorel" is a registered trademark of the Minnesota Mining and Manufacturing Company and is an elastomeric copolymer of perfluoropropene and vinylidene fluoride (20:80 mole ratio).

[3] 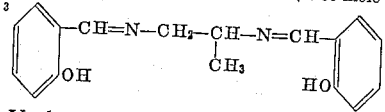

Various other modifications will become apparent to persons skilled in the art from this disclosure, and the illustrative examples are intended only to exemplify the invention and not to limit the scope thereof.

We claim:

1. A method for preventing scorch in the curing of highly fluorinated copolymers which comprises admixing with 100 parts by weight of an elastomeric copolymer of vinylidene fluoride and a member of the group consisting of perfluoropropene and chlorotrifluoroethylene (a) between about 0.1 and about 10 parts of a member of the group consisting of primary polyamines, secondary polyamines, and nonaromatic polyfunctional amine salts having from 3 to 16 carbon atoms and having the formula

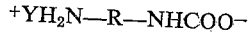

in which R is a radical selected from the group consisting of a cyclic alkylene and an acyclic alkylene and Y is selected from the group consisting of hydrogen, alkyl and aryl, and (b) between about 0.1 and 10 parts by weight of a non-crosslinking compound liberating carbon dioxide when heated to a temperature below 350° F.

2. The method of claim 1 in which the elastomeric copolymer is a copolymer of vinylidene fluoride and perfluoropropene.

3. The method of claim 1 in which the elastomeric copolymer is a copolymer of vinylidene fluoride and chlorotrifluoroethylene.

4. A scorch resistant, thermally curable highly fluorinated polymeric composition which comprises (a) an elastomeric copolymer of vinylidene fluoride and a member of the group consisting of perfluoropropene and chlorotrifluoroethylene (b) between about 0.1 and about 10 parts of a member of the group consisting of primary polyamines, secondary polyamines, and nonaromatic polyfunctional amine salts having from 3 to 16 carbon atoms and having the formula

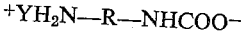

in which R is a radial selected from the group consisting of a cyclic alkylene and an acyclic alkylene and Y is selected from the group consisting of hydrogen, alkyl and aryl, and (c) between about 0.1 and about 10 parts by weight of a non-crosslinking compound liberating carbon dioxide when heated to a temperature below 350° F.

5. The composition of claim 4 in which the elastomeric copolymer is a copolymer of vinylidene fluoride and perfluoropropene.

6. The composition of claim 4 in which the elastomeric copolymer is a copolymer of vinylidene fluoride and chlorotrifluoroethylene.

References Cited in the file of this patent

Moran et al.: Ind. and Eng. Chem., vol. 51, No. 7, July 1959 (pages 831–2). (Copy in Scientific Library.)

UNITED STATES PATENT OFFICE
CERTIFICATE OF CORRECTION

Patent No. 3,116,266                      December 31, 1963

David Alwyn Stivers et al.

It is hereby certified that error appears in the above numbered patent requiring correction and that the said Letters Patent should read as corrected below.

Column 4, line 25, for "(-NHCII⁻)" read -- (-NHCOO⁻) --; column 8, line 30, for "storch" read -- scorch --.

Signed and sealed this 9th day of June 1964.

(SEAL)
Attest:

ERNEST W. SWIDER
Attesting Officer

EDWARD J. BRENNER
Commissioner of Patents